(12) United States Patent
Nakagawa et al.

(10) Patent No.: US 7,397,999 B2
(45) Date of Patent: Jul. 8, 2008

(54) SIGNAL RECEIVER

(75) Inventors: Satoaki Nakagawa, Tokyo (JP);
Nobuhiro Kimura, Tokyo (JP)

(73) Assignee: Mitsubishi Denki Kabushikia Kaisha, Tokyo (JP)

( * ) Notice: Subject to any disclaimer, the term of this patent is extended or adjusted under 35 U.S.C. 154(b) by 1175 days.

(21) Appl. No.: 09/757,645

(22) Filed: Jan. 11, 2001

(65) Prior Publication Data

US 2001/0022630 A1    Sep. 20, 2001

(30) Foreign Application Priority Data

Jan. 13, 2000    (JP)    ............... 2000-004377

(51) Int. Cl.
*H04N 5/91* (2006.01)
(52) U.S. Cl. .................... 386/46; 386/95
(58) Field of Classification Search ............ 386/46, 386/83, 95; 348/563
See application file for complete search history.

(56) References Cited

U.S. PATENT DOCUMENTS

| | | | | |
|---|---|---|---|---|
| 5,307,173 A | * | 4/1994 | Yuen et al. | ............ 386/83 |
| 5,517,321 A | * | 5/1996 | Yoshida | ............ 388/96 |
| 5,575,000 A | * | 11/1996 | Park et al. | ............ 455/186.2 |
| 6,185,360 B1 | * | 2/2001 | Inoue et al. | ............ 386/46 |
| 6,370,317 B2 | * | 4/2002 | Nagano et al. | ............ 386/83 |

FOREIGN PATENT DOCUMENTS

| | | | |
|---|---|---|---|
| JP | A8023489 | | 1/1996 |
| JP | 08-065661 A | * | 3/1996 |
| JP | A8065661 | | 3/1996 |
| JP | A10270984 | | 10/1998 |

* cited by examiner

*Primary Examiner*—Huy T Nguyen
(74) *Attorney, Agent, or Firm*—Birch, Stewart, Kolasch & Birch, LLP

(57) ABSTRACT

A signal receiver for displaying received broadcast electric waves including: a first memory for storing as a past record information representing whether the signal receiver was previously subjected to initial setup, an alarm device for alarming the necessity of initial setup of the signal receiver when the connection of a power source plug to an external power source is detected and no past record exists in the first memory, whereby a user can surely perform the initial setup, a second memory for holding the initial setup frame displayed on the display device after a response to the alarm of said alarm device is received or at the same time when the alarm is made, a third memory for storing district codes and reception channel groups corresponding to the respective district codes as a district code comparative chart district, and a tuner with which when a district code is input on the initial setup frame, the reception channel group corresponding to the district code thus input is read out and a channel contained in the reception channel group thus read out is selected.

15 Claims, 6 Drawing Sheets

Fig. 5

AREA CODE LIST

| PREFECTURES | CITY | AREA CODE | CHANNEL DISPLAY | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| HOKKAIDO | SAPPORO | 001 | HOKKAIDO BROADCASTING 1 | | NHK GENERAL 3 | TV HOKKAIDO 17 | SAPPORO TV 5 | | | HOKKAIDO CULTURE 27 | | HOKKAIDO TV 35 | | NHK EDUCATION 12 |
| | ASAHIKAWA | 048 | | NHK EDUCATION 2 | HOKKAIDO CULTURE 37 | TV HOKKAIDO 33 | HOKKAIDO TV 39 | | SAPPORO TV 7 | | NHK GENERAL 9 | | HOKKAIDO BROADCASTING 11 | |
| | KITAMI | 049 | | NHK EDUCATION 2 | | HOKKAIDO TV 61 | HOKKAIDO CULTURE 59 | HOKKAIDO BROADCASTING 6 | | | NHK GENERAL 9 | | HOKKAIDO BROADCASTING 53 | |
| | OBIHIRO | 050 | HOKKAIDO CULTURE 32 | | HOKKAIDO TV 34 | NHK GENERAL 4 | | HOKKAIDO BROADCASTING 6 | SAPPORO TV 7 | | | SAPPORO TV 10 | | NHK EDUCATION 12 |
| | KUSHIRO/MURORAN | 051 | | NHK EDUCATION 2 | HOKKAIDO TV 39 | HOKKAIDO CULTURE 41 | | HOKKAIDO BROADCASTING 6 | SAPPORO TV 7 | | NHK GENERAL 9 | | HOKKAIDO BROADCASTING 11 | |
| | HAKODATE | 052 | TV HOKKAIDO 21 | HOKKAIDO CULTURE 27 | HOKKAIDO TV 35 | NHK GENERAL 4 | | | | | | NHK EDUCATION 10 | | SAPPORO TV 12 |
| | ABASHIRI | 066 | HOKKAIDO BROADCASTING 1 | | NHK GENERAL 3 | | SAPPORO TV 5 | | HOKKAIDO CULTURE 7 | | HOKKAIDO TV 35 | | | NHK EDUCATION 12 |
| AOMORI | AOMORI | 002 | AOMORI BROADCASTING 1 | | NHK GENERAL 3 | AOMORI ASAHI 34 | NHK EDUCATION 5 | | | | | | | AOMORI TV 38 |
| | HACHINOHE | 053 | | | | AOMORI ASAHI 34 | | | NHK EDUCATION 7 | | NHK GENERAL 9 | | AOMORI BROADCASTING 11 | AOMORI TV 33 |
| IWATE | MORIOKA | 003 | TOHOKU BROADCASTING 1 | | | NHK GENERAL 4 | | IWATE BROADCASTING 6 | | NHK EDUCATION 8 | IWATE ASAHI 31 | TV IWATE 35 | | IWATE MENKOI 33 |
| | OHDATE | 054 | TOHOKU BROADCASTING 1 | | | NHK GENERAL 4 | AKITA ASAHI 59 | AKITA BROAD-CASTING 6 | | NHK EDUCATION 8 | | | | AKITA TV 57 |
| | KAMAISHI | 071 | | NHK EDUCATION 2 | | IWATE ASAHI 62 | | IWATE MENKOI 60 | | TV IWATE 58 | | TV IWATE 10 | | NHK EDUCATION 12 |
| MIYAGI | SENDAI | 004 | TOHOKU BROADCASTING 1 | | NHK GENERAL 3 | | NHK EDUCATION 5 | | EAST JAPAN BROADCASTING 32 | | MIYAGI TV 34 | | | SENDAI BROADCASTING 12 |
| | ISHINOMAKI | 072 | TOHOKU BROADCASTING 1 | | NHK GENERAL 3 | | NHK EDUCATION 5 | | EAST JAPAN BROADCASTING 7 | | | MIYAGI TV 10 | | SENDAI BROADCASTING 12 |
| MIYAZAKI | MIYAZAKI | 045 | | | TV MIYAZAKI 35 | | | MIYAZAKI BROAD-CASTING 6 | | NHK GENERAL 8 | | MIYAZAKI BROADCASTING 10 | | NHK EDUCATION 12 |
| | NOBEOKA | 064 | | NHK EDUCATION 2 | | NHK GENERAL 4 | | | | TV MIYAZAKI 39 | KAGOSHIMA TV 38 | | | |
| KAGOSHIMA | KAGOSHIMA | 046 | SOUTH JAPAN BROADCASTING 1 | | | | | KAGOSHIMA BROADCASTING | KAGOSHIMA BROADCASTING | | | | KAGOSHIMA YOMIURI 30 | |
| | AKUNE | 065 | | KAGOSHIMA YOMIURI 17 | KAGOSHIMA BROADCASTING 23 | KAGOSHIMA BROADCASTING | KAGOSHIMA 35 | | | NHK GENERAL 8 | | SOUTH JAPAN BROADCASTING 10 | | NHK EDUCATION 12 |
| OKINAWA | NAHA | 047 | RYUKYU ASAHI 28 | NHK GENERAL 2 | | | | | | OKINAWA BROADCASTING 8 | | RYUKYU BROADCASTING 10 | | NHK EDUCATION 12 |

Fig. 6

AREA CODE LIST

| STATE | CITY | AREA CODE | CHANNEL DISPLAY ||||||||||
|---|---|---|---|---|---|---|---|---|---|---|---|
| | | | 1 | 2 | 3 | 4 | 5 | 6 | 7 | 8 | 9 |
| CALIFORNIA | LOS ANGELES | 027 | | KCBS | | KNBC | KTLA | | KABC | | KCAL |
| | SAN DIEGO | 028 | | | XHTJB | | | XETV | | KFMB-TV | |
| | SAN FRANCISCO | 029 | | KTVU | | KRON-TV | KPIX-TV | | KGO-TV | KQED-TV | |
| | SACRAMENTO | 030 | | | KCRA-TV | | | KVIE | | | |
| NEVADA | CARSON CITY | 042 | | KTVN | | KRNV | KNPB | | | KOLO-TV | |
| | LAS VEGAS | 043 | | | KVBC | | KVVU-TV | | KLAS-DT | KLAS-TV | |

SIGNAL RECEIVER

BACKGROUND OF THE INVENTION

1. Field of the Invention

The present invention relates to a signal receiver for TV, VCR (Video cassette recorder), an optical disc apparatus, etc. for receiving broadcast electric waves such as TV broadcast, etc., and particularly to a signal receiver on which a user can surely and easily conduct initial setup.

2. Description of the Related Art

FIG. 2 is a diagram showing an initial setup method in a conventional receiver. The initial setup defined in this specification contains channel automatic setup (this is a system for automatically searching and setting receivable ch (channels), time setup, just clock channel setup (this is a system for automatically correcting a built-in clock of VCR in synchronism with a time casting from a predetermined broadcast station such as an NHK (Nippon Hoso Kyokai) Education channel or the like), guide channel setup (this is a system for rearranging channels at the apparatus side to associate guide channels used for G codes (Registered Trademark of Gemstar Development Corporation) with recording channels which are different among districts), etc.

The conventional initial setup method will be described hereunder in the case where VCR is used.

(Channel Setup)

After VCR serving as a signal receiver and TV serving as a display device are subjected to a predetermined wiring connection, a menu key of a remote controller for VCR is pushed (7) to display a menu (main menu) frame (8) on TV under the state that VCR is under a power-on state (6) (this state is referred to as "initial state"), and then an item of initial setup (First time setup) is selected (9).

Subsequently, in the case of Japan, when a user selects channel automatic setup (10), VCR starts a tuning operation to search receivable ch (channels). After the search of all the receivable channels is completed, VCR finishes the channel setup and returns to its initial state (11).

In the case of United States of America, when a user selects "Memorize channels" and selects an antenna input type (Cable, Cable box only, Digital cable box only, Indoor/Outdoor ant.) on the Memorize Channels display frame, VCR starts the tuning operation to search receivable ch (channels). After the search of all the receivable channels is completed, VCR finishes the channel setup and then returns to its initial state.

(Time setup)

Subsequently, the user pushes the menu key of the remote controller again (7) to display the menu frame on TV (8), and selects the item of the initial setup (9). When the user selects time setup to set the current time (12), a time setup frame is displayed, and the apparatus requests the user to input items of "year", "month", "hour", "minute" (in U.S.A., "Daylight saving" is further input). When the user sets the respective items, the time setup is completed (13).

(Just Clock (Auto clock) Channel Setup)

Subsequently, a predetermined channel for time adjustment is input on the time setup frame (14), and the just clock setup is finished (15). Through this setup, a channel from which a reference time to actuate the just clock function should be obtained is set. In Japan, NHK General or NHK education channel is selected, and in U.S.A. a predetermined channel which is settled every district is selected.

(Guide Channel Setup)

After G code of NHK General (16) is input, a channel at which the NHK General broadcast can be received in the district concerned is input (17) to rearrange the channels. The same operation is also carried out for the NHK Education channel. That is, after an NHK Education G code (19) is input, a channel at which the NHK Education broadcast can be received in the district concerned is input (20) to rearrange the channels. The apparatus carries out the channel rearrangement on the basis of the input channel, and then completes the guide channel setup (18).

Since the initial setup of the conventional receiver is carried out according to the above setup procedure, the initial setup time is greatly different among individual users because they have different knowledge on their apparatuses and are familiar with their apparatuses in different level. Further, when the initial setup is carried out, a user may be confused with the initial setup because it must be carried out through many selection display frames, so that he/she makes an erroneous initial setup. Still further, when a user lacks the knowledge on the rearrangement of the guide channel, a recording miss may occur.

The present invention has been implemented in order to solve the above problem, and has an object to provide a signal receiver which can easily and surely perform the initial setup irrespective of the level difference in knowledge among users.

SUMMARY OF THE INVENTION

According to the present invention, a signal receiver for displaying received broadcast electric waves includes a first memory for storing as a past record information representing whether the signal receiver was previously subjected to initial setup, and an alarm device for alarming the necessity of initial setup of the signal receiver when the connection of a power source plug to an external power source is detected and no past record exists in the first memory, whereby a user can surely perform the initial setup.

In the signal receiver of the present invention, the alarm device comprises a button formed of a transparent member provided on the front face of the signal receiver, and a light emitting element which is provided inside the button and can be actuated to be turned on and off. Therefore, the user can visually recognize the necessity of the initial setup, and carry out the initial setup surely.

Further, the signal receiver according to the present invention further includes a second memory for holding the initial setup frame displayed on the display device after a response to the alarm of the alarm device is received or at the same time when the alarm is made, a third memory for storing district codes and reception channel groups corresponding to the respective district codes as a district code comparative chart district, and a tuner (channel selecting) circuit with which when a district code is input on the initial setup frame, the reception channel group corresponding to the district code thus input is read out and a channel contained in the reception channel group thus read out is selected, whereby the channel setup corresponding to the district concerned is automatically carried out for the user by merely inputting the district code in response to the alarm from the signal receiver. Therefore, the initial setup can be simply and surely carried out irrespective of the difference in knowledge among users.

In the present invention, the district code comparative chart may be designed to contain a code for stopping the tuning operation (channel selecting operation) and/or a code for allowing the tuning operation through only the external input, thereby achieving a multi-functional signal receiver.

In the present invention, the district code comparative chart is constructed by allocating district codes to cities having large populations or a large number of households and associating the district codes thus allocated with the reception channel groups of the cities, whereby the required memory capacity can be reduced and thus a signal receiver which is low in price can be achieved.

In the present invention, the district codes of cities which are common in reception channel group may be set to the same code, whereby the required memory capacity can be further reduced and thus a signal receiver which is lower in price can be achieved.

In the present invention, district codes are allocated to the areas corresponding to area codes, and the district codes thus allocated are associated with the reception channel groups of the respective areas. Further, if plural kinds of reception channel groups whose number exceeds a predetermined number exist in the area corresponding to the area code, plural district codes are allocated in accordance with the kind of the reception channel group, thereby constructing the district code comparative chart. Therefore, the disadvantage occurring when the district code comparative chart is created with the area code as a key can be overcome, and thus a signal receiver which is low in price as a whole can be achieved.

BRIEF DESCRIPTION OF THE DRAWINGS

FIG. 5 is a diagram showing a district code comparative chart of the signal receiver according to the present invention; and FIG. 6 is a diagram showing the district code comparative chart of the signal receiver according to the present invention.

DETAILED DESCRIPTION OF THE PREFERRED EMBODIMENTS

Preferred embodiments according to the present invention will be described hereunder with reference to the accompanying drawings.

[First Embodiment]

Figure 1:
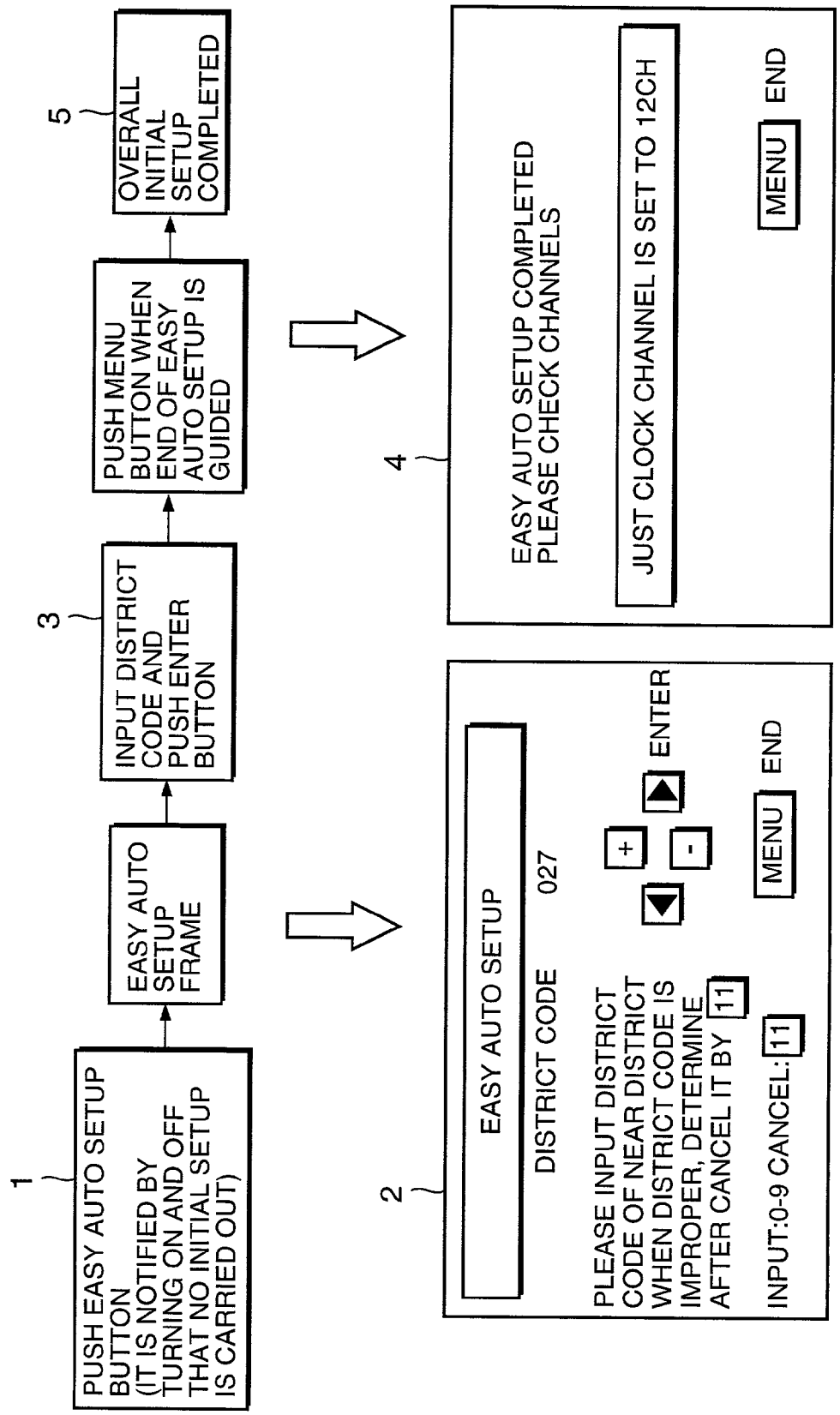
FIG. 1 is a diagram showing the procedure of an initial setup (Easy Auto Setup) of a signal receiver according to the present invention, and also shows display frames displayed on TV.
Figure 2:
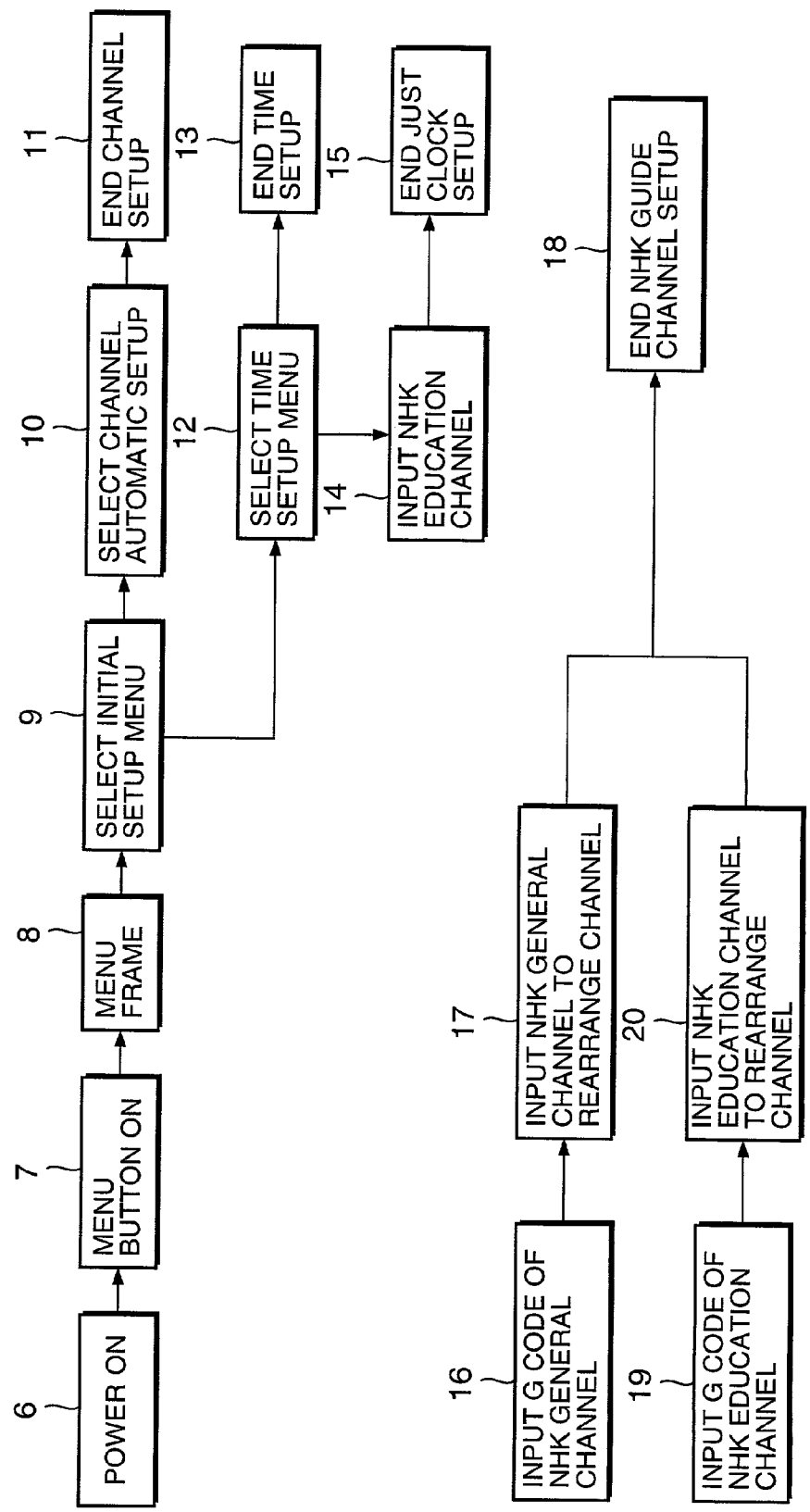
FIG. 2 is a block diagram showing the procedure of the initial setup in the conventional signal receiver.

A signal receiver according to a first embodiment of the present invention will be described by using VCR. FIG. 1 is a block diagram showing the initial setup of VCR, and also shows display frames which are displayed at respective time points on the screen of TV connected to VCR.

After a user purchases VCR, he/she completes an antenna input connection work and also a connection work between VCR and TV, and then plugs in VCR to an electric outlet. When VCR is plugged in, VCR detects a past record to judge whether initial setup was previously carried out. If it is recognized that no initial setup was previously made, an Easy Auto Setup button provided on the front face of the main body of VCR is repetitively turned on and off (1) and alarms the user to push this button.

Figure 4:
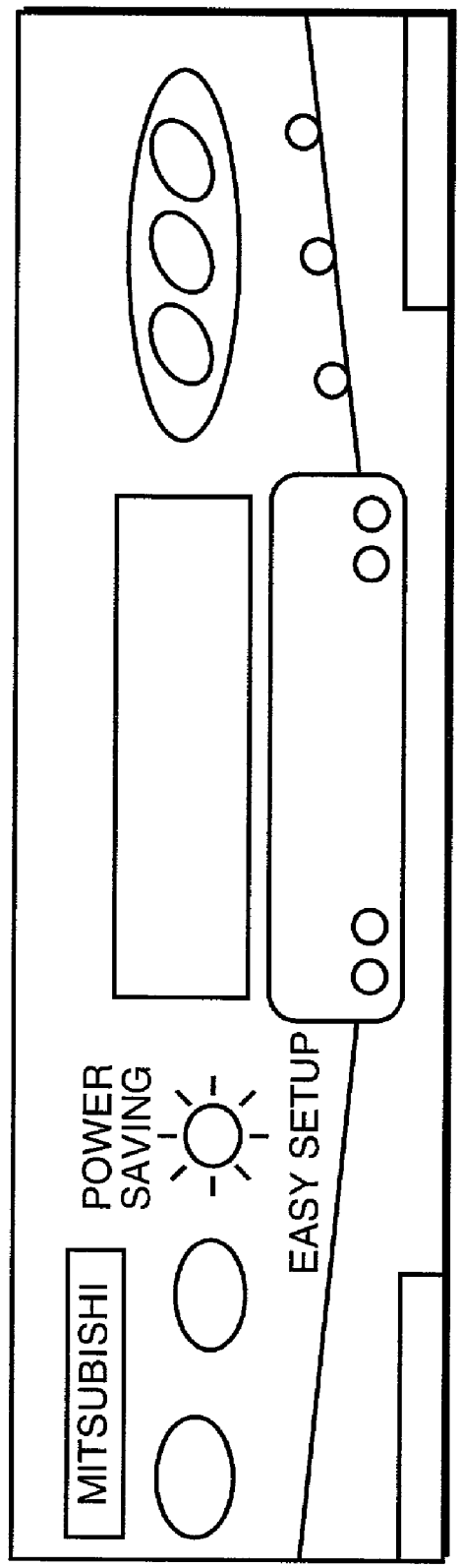
FIG. 4 is a diagram showing the outlook of the signal receiver according to the present invention.

FIG. 4 is a diagram showing the main body of VCR.

The Easy Auto Setup button comprises a transparent plastic and a light emitting diode which is disposed in the transparent plastic and is turned on and off, for example. When the user pushes the setup button, the initial setup frame (hereinafter referred to as "Easy Auto Setup frame") is displayed (2) to promote input of the number of a district code. The district code will be described later in detail.

The user selects the number of the district code allocated to the user's location from a district code table appended as papers, and inputs the number of the district code thus selected by operating the VCR itself or using a remote controller for VCR (3). VCR collates the district code thus input with the district code comparative chart stored in memory means such as ROM or the like which is provided in VCR, and performs a tuning operation so that the channel group corresponding to the district concerned can be received. The details of the district code comparative chart will be described.

With respect to the time setup for VCR, the time corresponding to a shipping district is preset at the time when VCR is shipped from a factory, and the accurate time is kept by using a backup battery provided in VCR under the shipment. When VCR is started, the driving power is automatically switched from the backup battery to the power from an electric outlet, whereby the time setup is carried out as if it is automatically carried out.

With respect to the just clock (Auto clock), in order that a predetermined time synchronizing channel (for example, NHK Education channel) is automatically set in connection with the input of the number of the district code, the connection relationship is stored in the memory means, whereby the just clock function automatically works on the basis of the information of the memory means. During the initial setup period, an image display or voice indicating "Please wait for a while" or the like is made in order to enable the user to understand the current state of VCR. After the Easy Auto Setup is completed, a completion display and a just clock setup channel are displayed and informed to the user (4). The user pushes the menu button on the display frame to complete the whole initial setup (5).

Figure 3:
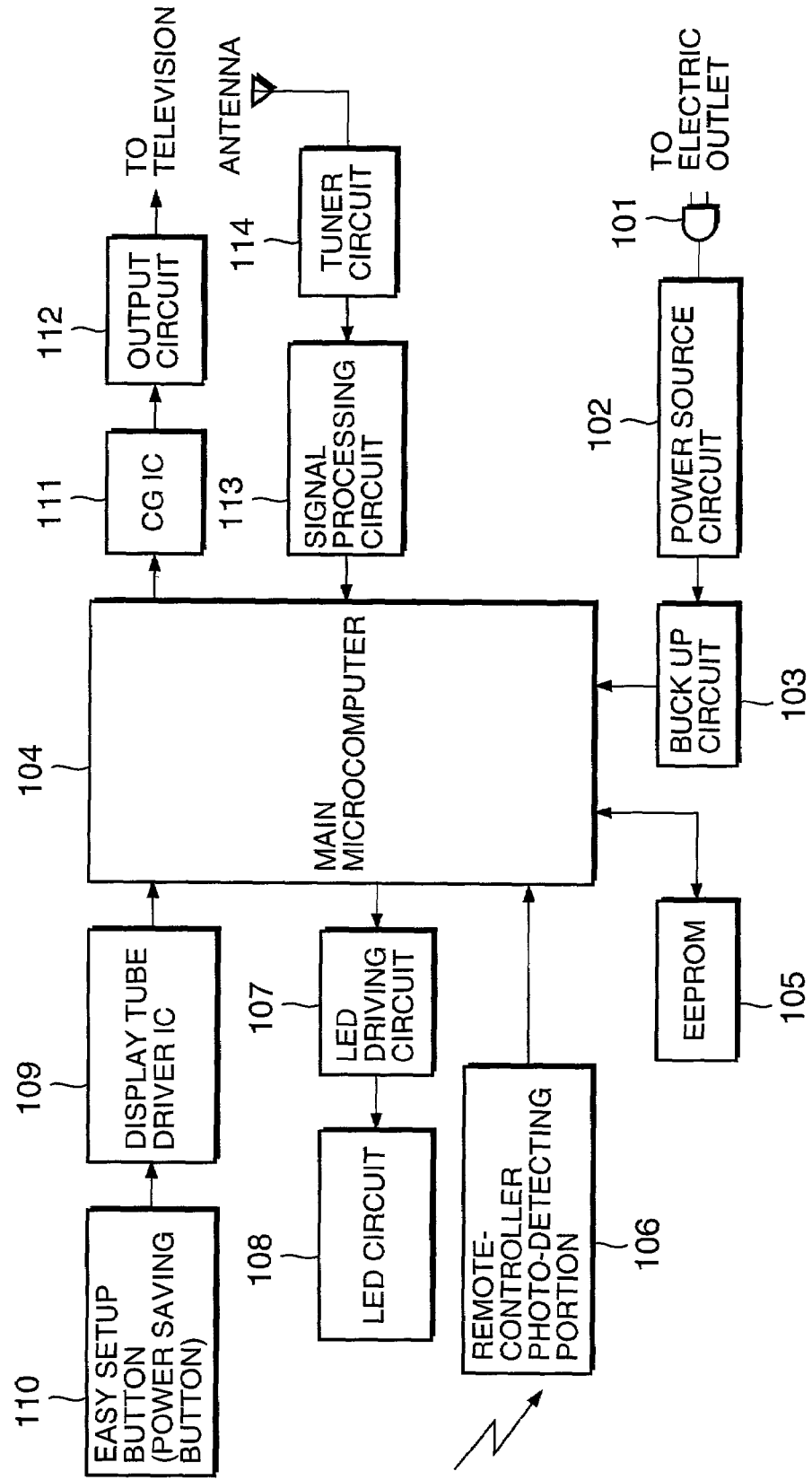
FIG. 3 is a block diagram showing the construction of a signal receiver according to the present invention.

FIG. 3 is a block diagram showing a specific circuit construction.

In FIG. 3, reference numeral 101 represents a power source plug through which VCR is connected to an external power source, reference numeral 102 represents a power source circuit serving as a backup battery which is provided in VCR in advance, reference numeral 103 represents a backup circuit, reference numeral 104 represents a main microcomputer which controls the operation of VCR and has memory means for storing the district code comparative chart described above, reference numeral 105 represents EEPROM (Electrically Erasable Programmable ROM) for storing a past record indicating whether VCR was previously subjected to initial setup, reference numeral 106 represents a remote-controller photodetecting portion for photodetecting signals from the remote controller, reference numeral 107 represents an LED (Light Emitting Diode) driving circuit, reference numeral 108 represents an LED circuit for turning on, turning off or turning on and off on the basis of a signal from the LED driving circuit, reference numeral 109 represents a display tube driver IC for notifying input information from the Easy Auto Setup button 110 to the main microcomputer 104, and reference numeral 110 represents the Easy Auto Setup button according to the present invention. In this embodiment, in order to prevent increase of the number of parts, the Easy Auto Setup button and a power saving button are made common to each other, however, they may be provided independently of each other.

Reference numeral 111 represents CG (Computer Graphic) IC for holding the Easy Auto Setup frame and displaying the frame on TV in response to an instruction from the main microcomputer 4, reference numeral 112 represents a VIDEO output terminal, reference numeral 113 represents a signal processing circuit for performing signal processing of broadcasts received, and reference numeral 114 represents a tuner circuit for selecting one of broadcast stations of broadcasts input from the antenna.

Next, the operation of the above circuit will be described hereunder.

After purchasing VCR, the user first connects an antenna cable and an output cable to each other to set VCR. When the power source plug 101 is inserted into an electric outlet, AC power is supplied to the power source circuit 102. AC voltage is converted DC voltage in the power source circuit 102 and then the DC voltage output from the power source circuit 102 is applied to BACKUP circuit 103, whereby the power from the battery (lithium battery) actuated in the BACKUP circuit 103 is switched to the power from the power source circuit 102 to supply power to the main microcomputer 104. At the same time, the main microcomputer 104 recognizes that the power source plug 101 is inserted.

Subsequently, the main microcomputer 104 accesses EEPROM 105 to check a past record indicating whether the initial setup was previously carried out. If no past record indicating the initial setup exists, LED of the LED circuit 103 is turned on and off through the LED driving circuit 107, and it is alarmed to the user through the Easy Auto Setup button on the front face of the main body of VCR that no initial setup has been carried out, thereby promoting the user to carry out the Easy Auto Setup. In this case, an acoustic alarming, for example, sounds may be added to the visual alarming based on the turn-on/off button, or only the acoustic alarming may be used in spite of the visual alarming.

Subsequently, the user pushes the Easy Auto Setup button 110 to carry out the initial setup. The button input information thus input is read out by the display tube driver 109 and transmitted to the main microcomputer 104. When recognizing that the Easy Auto Setup button 110 is pushed, the main microcomputer 104 accesses CG IC 111 and transmits a signal to display the Easy Auto Setup frame on TV. On the basis of the signal thus transmitted, CG IC 111 transmits the Easy Auto Setup frame to the VIDEO output circuit 112 to display the Easy Auto Setup frame on TV screen.

Subsequently, on the Easy Auto Setup frame, the user reads out from the district code table the number of the district code for a place at which the user stays, and inputs the number of the district code by ten keys of the remote controller or the like. The number of the district code thus input is converted to a remote controller code and it is transmitted to the remote-controller photodetecting portion 106. The remote control code thus transmitted by the photodetecting portion 106, and then transmitted to the main microcomputer 104. In the main microcomputer 104, the district code input by the user is collated with the built-in district code comparative chart to select the corresponding tuning table (reception channel group), and the tuning operation is started. The tuning operation of each broadcast station (that is, the selection of each broadcast station) is carried out by the tuner circuit 114, and the tuning result is transmitted through the signal processing circuit 113 to the main microcomputer 114. The turned channels are allocated to the respective video channels. During this operation, the user can know, with an image display or voice, that the initial setup is being carried out. When the whole tuning operation is completed, the completion of the Easy Auto Setup is displayed for the user through CG IC 111 and the VIDEO output terminal 112, and the Easy Auto Setup is finished after user's certification. The time setup and the just clock setup are the same as described above, and thus the description thereof is omitted.

Next, the district code and the district code comparative chart will be described.

FIGS. 5 and 6 partially show district code comparative charts according to this embodiment. The district code comparative chart of FIG. 5 is for Japan, and that of FIG. 6 is for U.S.A. Each of these tables represents the relationship between signal reception districts (expressed as city name— district code number) and reception channels corresponding to the districts. As is apparent from the tables, reception channels are very different among respective districts. Accordingly, in order to apply the present invention to an inexpensive signal receiver such as VCR or the like, it is required to set the relationship between proper districts and reception channels with as less a memory capacity as possible.

In this embodiment, in consideration of the above requirement, main cities of prefectures (the metropolis and districts) are extracted, and the population and the number of households of each city are investigated, whereby as many users as possible can use the present invention with small memory capacity. Further, the relationship of the reception channels of the respective cities are also investigated, and a more representative city is selected for cities to which a reception channel group is common (overlapped), thereby preventing the vain use of the memory.

Further, some main cities contain such specific districts that the reception channel relationship thereof is varied. For example, the relationship of the reception channels is greatly different among neighboring districts in Fukuoka prefecture, and the reception channels are exchanged between neighboring districts in accordance with the geographical features of surroundings (mountains, etc.) (for example, Osakashi city, Hirakatashi city, etc.) Therefore, in such a case, in consideration of the population and the number of households of other cities, plural codes are allocated to the city concerned, thereby broadening the range to which the present invention is practically applied.

In order to support G codes of Gemstar Development Corporation which have been standardly adopted for current VCRs, the code setting is made so as to cover 65 districts (representative districts containing places at which government offices of prefectures are located) which are indicated by the Gemstar Development Corporation.

In the comparative chart, the districts for which the district codes are set are determined with the population and the number of households of each city being used as keys, however, other methods may be used. For example, the district codes may be set with the area code of telephone as a key. With this method, in some prefecture, the area of one area code is excessively broadened, and thus different kinds of reception channel group areas exist in the area concerned. Therefore, there may occur such a demerit that the population in which the present invention is effectively used is reduced. Therefore, for such an area, it is necessary to allocate plural codes while an area having overlapped reception channel groups is considered.

[Second Embodiment]

In this embodiment, a channel tuning (selection) stop code is further provided to the district code comparative chart described in the first embodiment. If the user selects this tuning stop code when inputs a district code number, VCR displays the end display and the just clock setup channel for the user without carrying out the channel reception operation. The user pushes the remote controller menu button on the Easy Auto Setup frame to finish the overall initial setup.

The time setup of this embodiment is the same as the first embodiment, and thus the description thereof is omitted.

[Third Embodiment]

In this embodiment, an external input code is further provided to the district code comparative chart of the first and second embodiment. If the user selects the external input code when inputs the district code number, VCR sets only the external input without carrying out the channel reception operation, and then displays the end display and the just clock setup channel for the user. The user pushes the remote controller menu button on the Easy Auto Setup frame to finish the overall initial setup. The time setup of this embodiment is the same as the first and second embodiment, and thus the description thereof is omitted.

[Fourth Embodiment]

In the above embodiment, when the user pushes the Easy Auto Setup button which is turned on and off, the Easy Auto Setup frame is displayed on the TV to promote input of a district code. In this embodiment, the control of the main microcomputer 4 is reconstructed so that the Easy Auto Setup frame is displayed on the TV at the same time when the Easy Auto Setup button is turned on and off. Accordingly, the user can perform the initial setup by pushing the setup button which is turned on and off, and selecting district code number from the district code number table appended to the VCR and then inputting the selected number through the VCR or by using the remote controller. The other processing of this embodiment is the same as the above described embodiments, and thus the description thereof is omitted.

What is claimed is:

1. A signal receiver for displaying received broadcast electric waves including:
    a first memory for storing as a past record information representing whether the signal receiver was previously subjected to initial setup; and
    an alarm device for alarming the necessity of initial setup of the signal receiver, which is activated by a processing device, when the connection of a power source plug to an external power source is detected by said processing device and no past record exists in the first memory, whereby a user performs the initial setup using a guided setup which is initiated in response to the alarm device and/or an activation device being activated.

2. The signal receiver as claimed in claim 1, wherein said alarm device comprises a button formed of a transparent member provided on the front face of the signal receiver, and a light emitting element which is provided inside the button and can be actuated to be turned on and off.

3. The signal receiver as claimed in claim 1, further including a second memory for holding the initial setup frame displayed on a display device after a response to the alarm of said alarm device is received or at the same time when the alarm is made; a third memory for storing district codes and reception channel groups corresponding to the respective district codes as a district code comparative chart; and a tuner circuit with which when a district code is input on the initial setup frame, the reception channel group corresponding to the district code thus input is read out and a channel contained in the reception channel group thus read out is selected.

4. A signal receiver for displaying received broadcast electric waves including:
    a first memory for storing as a past record information representing whether the signal receiver was previously subjected to initial setup;
    an alarm device for alarming the necessity of initial setup of the signal receiver when the connection of a power source plug to an external power source is detected and no past record exists in the first memory, whereby a user can surely perform the initial setup; and
    a second memory for holding the initial setup frame displayed on a display device after a response to the alarm of said alarm device is received or at the same time when the alarm is made; a third memory for storing district codes and reception channel groups corresponding to the respective district codes as a district code comparative chart; and a tuner circuit with which when a district code is input on the initial setup frame, the reception channel group corresponding to the district code thus input is read out and a channel contained in the reception channel group thus read out is selected;
    wherein the district code comparative chart is designed to contain a code for stopping the tuning operation and/or a code for allowing the tuning operation through only the external input.

5. The signal receiver as claimed in claim 3, wherein the district code comparative chart is designed by allocating district codes to cities having large populations or a large number of households and associating the district codes thus allocated with the reception channel groups of the cities.

6. The signal receiver as claimed in claim 5, wherein the district codes of cities which are common in reception channel group are set to the same code.

7. The signal receiver as claimed in claim 3, wherein the district code comparative chart is designed by allocating district code to the areas corresponding to area codes, the district codes thus allocated are associated with the reception channel groups of the respective areas, and if plural kinds of reception channel groups whose number exceeds a predetermined number exist in the area corresponding to the area code, plural district codes are allocated in accordance with the kind of the reception channel group.

8. An electronic receiver having a plurality of programmable initial settings, comprising:
    a processing device for detecting the connection of a power source plug to an external power source;
    a controller for detecting whether the initial settings are programmed into the electronic receiver, which is activated by said processing device;
    an alarm, responsive to the controller, for notifying a user that the initial settings are not programmed into the electronic receiver;
    an activation device operatively associated with the alarm, and
    a guided menu for programming the initial settings into the electronic receiver, when the user responds to the alarm and the activation device.

9. An electronic receiver according to claim 8 wherein the alarm emits an optical warning from a light emitting source and the activation device includes a pushbutton operatively associated with the light emitting source.

10. An electronic receiver according to claim 9 wherein the alarm further includes an audible warning.

11. An electronic receiver according to claim 8 wherein the initial settings are selected from the group comprising the local time, the date, a geographic region, or a group of channels.

12. An electronic receiver according to claim 11 wherein at least one initial setting is detected by the controller and automatically programmed.

13. An electronic receiver according to claim 8 wherein the receiver includes a VCR.

14. A method for programming an electronic receiver having a plurality of initial settings, comprising:
    providing a processing device for detecting the connection of a power source plug to an external power source;

detecting whether the initial settings are programmed into the electronic receiver, which is activated by said processing device;

warning a user that the initial settings are not programmed into the electronic receiver;

providing a user input device to be activated in response to the warning; and providing a guided menu for programming the initial settings into the electronic receiver, when the user responds to the warning and activates the input device.

15. A method for displaying received broadcast electric waves including:

storing in a first memory as a past record information representing whether the signal receiver was previously subjected to initial setup; and providing an alarm device for alarming the necessity of initial setup of the signal receiver, which is activated by a processing device, when the connection of a power source plug to an external power source is detected by said processing device and no past record exists in the first memory, whereby a user performs the initial setup using a guided setup which is initiated in response to the alarm device and/or an activation device being activated.

* * * * *